May 30, 1939.  R. C. JACOBS  2,160,505
GLARE SHIELD FOR AUTOMOBILES
Filed June 16, 1937
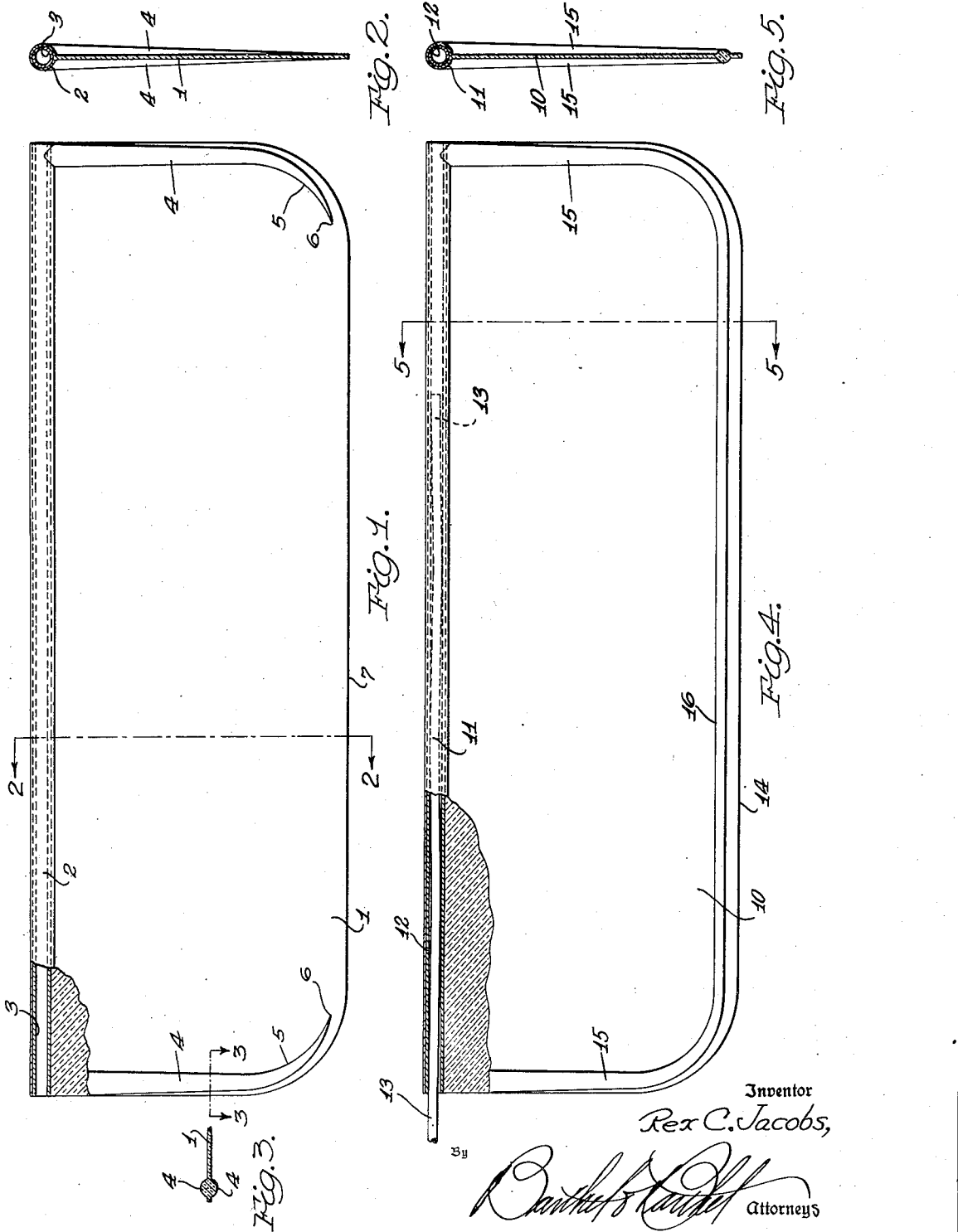
Inventor
Rex C. Jacobs,
By
Attorneys Patented May 30, 1939

2,160,505

UNITED STATES PATENT OFFICE 2,160,505

GLARE SHIELD FOR AUTOMOBILES

Rex C. Jacobs, Detroit, Mich.

Application June 16, 1937, Serial No. 148,549

8 Claims. (Cl. 296—97)

The present invention relates to automobile glare shields of the type which are transparent to a degree whereby they permit the operator of an automobile to observe the headlights of approaching vehicles without the glare from such headlights having harmful effect on the vision of the operator.

It is common practice to support automobile glare shields on a horizontal pivot upon which it may be swung to various positions, one being a position where it extends within the margin of the windshield opening and another being a position where it lies close to the roof of the automobile. Usually the element which provides a horizontal pivot is supported by a vertical pivot about which it may swing in a horizontal arc so as to position it adjacent the windshield opening or adjacent a window opening at one side of the windshield opening. The main object of the present invention is to provide a semi-transparent glare shield for support by a horizontal pivot of the character referred to above.

An important object of the present invention is to provide a glare shield which is shatter proof and non-inflammable. That is, the glare shield is formed of material embodying elasticity so that in the event of an accident and it becomes broken jagged splinters will not cause harm to the occupants of the automobile. Due to the close proximity of the glare shield to the eyes of the operator it is undesirable that it be formed of ordinary glass and laminated, shatter proof glass is ordinarily too heavy to hold positions of adjustment under the conditions of vibration which accompanies operation of a vehicle.

Still another important object of the present invention is to provide a semi-transparent glare shield of a material which may be molded and which includes coloring material. With such material the thickness thereof determines the degree of transparency and if the material passes a certain degree of thickness it becomes opaque. This characteristic presents a problem in that the material when molded thin enough to provide the desired degree of transparency it is not strong enough for its intended purpose. If it is made thick enough to provide the required mechanical strength it becomes practically opaque, or at least translucent.

With the above mentioned conditions in view the invention has as a further object to provide a glare shield of the material referred to embodying the desired degree of transparency and the required amount of mechanical strength. This is accomplished by forming the shield with a rigid metal tube extending along the upper edge thereof and imbedded in the material of which the shield is formed. One end of the metal tube is exposed so that a rod, which constitutes an undulating horizontal pivot in the glare shield assembly, may be inserted therein. This tube rigidifies the upper edge of the shield and to rigidify the vertical edges of the shield reinforcements are provided. These side reinforcements are formed by thickening the material of the shield and result in opaque portions. As pointed out, the opaque condition is undesirable, and in order to reduce the opaque areas to a minimum they are tapered and finally merge into the transparent portion of the shield. The reinforcements are disposed adjacent to the vertical edges of the shield and terminate at points spaced from the bottom edge of the shield. With this particular reinforcement structure practically the entire shield may be formed transparent, and the entire lower edge is transparent.

In using the present shield, the operator usually adjusts his eyes so that the lowermost edge of the shield is slightly lower than a line between his eyes and the oncoming light source so that it is possible to see the highway beneath the shield and still have his eyes protected from the glare. It is important, therefore, that the lower edge of the shield be transparent throughout its entire width.

Another object of the present invention is to provide a glare shield of the character above referred to and adapted for use with a horizontal pivot comprised of an undulating arm of the type shown in my prior Patent No. 1,995,772 of March 26, 1935.

In shields of the type here contemplated the material is such that they are flexible, and when the undulating arm is inserted in the tubular bearing portion it distorts the bearing to such an extent that the edge of the shield, which is parallel to the bearing, takes on a wavy form. Another object of the invention is to reinforce the shield in such manner that it retains its original form when the undulated supporting member is inserted in the bearing portion.

With the above and other ends in view the invention is more fully disclosed with reference to the accompanying drawing, in which:

Figure 1 is an elevation of a shield, partly broken away and in section;

Figs. 2 and 3 are sections taken respectively on the lines 2—2 and 3—3 of Fig. 1;

Fig. 4 is an elevation, partly in section, illustrating the reinforcement differently constructed, and Fig. 5 is a section taken on the line 5—5 of Fig. 4.

Like characters of reference are employed throughout to designate corresponding parts.

The numeral 1 designates a sheet of semi-transparent material, such as cellulose with coloring materials added thereto. This material, when formed in comparatively thin sheets is transparent, and as it increases in thickness it becomes translucent and opaque. The sheet 1 as here contemplated is of such thickness that it is partially transparent.

During the process of molding, the sheet 1 is provided with a portion of comparatively heavy section, designated 2, extending along the top edge thereof, and imbedded in this heavy portion is a metal tube 3. At least one end of the metal tube 3 is exposed to receive a supporting member (not shown). Integral with the sheet 1 and the portion 2 of heavy section are reinforcing ribs 4. The ribs 4 are disposed adjacent the two vertical or side edges of the shield 1 and gradually taper as they extend from the portion 2. The lower portions of the ribs 4 are curved inwardly of the shield as designated at 5 and taper to points 6 disposed at points spaced inwardly from the lower edge 7 of the shield. This disposition of the ribs 4, slightly spaced from the vertical edges as shown, and with the ribs curved and terminating at points spaced inwardly from the lower edge 7, provides the essential reinforcement with a minimum interference as to visibility.

Referring to Figs. 4 and 5, the numeral 10 designates a sheet of semi-transparent material similar to that described above. In the portion 11 of heavy section is provided a metal tube 12 in which is received an undulating support 13. The support 13 comprises an undulating rod such as is shown in my prior Patent 1,995,772. When this rod is inserted in the tube 12 it tends to prevent rotation of the tube except by manual operation, and hence it keeps the glare shield in the desired position. The insertion of the rod into the tube, under ordinary conditions, causes distortion of the tube to a small extent with the result that the lower edge 14 takes on a wavy form. To prevent this wavy formation the reinforcing ribs 15, which extend adjacent to the vertical sides of the shield, are untied at their lower ends by a reinforcing rib 16. The rib 16 extends parallel to the lower edge 14, substantially spaced therefrom.

Although specific embodiments of the invention have been illustrated and described it will be understood that various changes may be made within the scope of the appended claims without departing from the spirit of the invention, and such changes are contemplated.

What I claim is:

1. In a glare shield, formed of material in which the degree of transparency decreases with increasing thickness, a sheet formed of a thickness providing a predetermined degree of transparency, said sheet being reinforced at one longitudinal edge by a portion of comparatively thick section, said thickened portion having continuations extending along side edges of the sheet, the side continuations curving inwardly of the sheet and terminating at points spaced inwardly of the fourth edge of the sheet, said continuations and curved portions being gradually tapered toward said terminal points, and a metal reinforcing tube imbedded in the thickened portion of the sheet and providing a bearing for a support.

2. In combination with a glare shield formed of material in which the degree of transparency decreases with increasing thickness, a sheet formed of a thickness providing a predetermined degree of transparency, said sheet being reinforced at one edge by a portion of comparatively thick section, a tubular metal reinforcing element imbedded in said thickened portion and providing a bearing for the reception of a supporting element, and a reinforcement integral with said sheet and extending parallel to said bearing, said last named reinforcement being spaced from said bearing and substantially parallel thereto.

3. In combination with a glare shield formed of material in which the degree of transparency decreases with increasing thickness, a sheet formed of a thickness providing a predetermined degree of transparency, said sheet being reinforced at one edge by a portion of comparatively thick section, a tubular metal reinforcing element imbedded in said thickened portion and providing a bearing for the reception of an undulating supporting element, and a reinforcement integral with said sheet and extending parallel to said bearing, said last named reinforcement being spaced from said bearing.

4. In combination with a glare shield formed of material in which the degree of transparency decreases with increasing thickness, a sheet formed of a thickness providing a predetermined degree of transparency, said sheet being reinforced at one edge by a portion of comparatively thick section, a tubular metal element imbedded in said thickened portion and providing a bearing for the reception of a supporting element, and a reinforcement integral with said sheet and extending parallel to said bearing, said last named reinforcement being spaced from said bearing, said sheet having integral reinforcements uniting the last named reinforcement with the portion of increased thickness.

5. In combination with a glare shield formed of material in which the degree of transparency decreases with increasing thickness, a sheet formed of a thickness providing a predetermined degree of transparency, said sheet being reinforced at one edge by a portion of comparatively thick section, a tubular metal reinforcing element imbedded in said thickened portion and providing a bearing for the reception of an undulating supporting element, and a reinforcement integral with said sheet and extending parallel to said bearing, said last named reinforcement being spaced from said bearing, said sheet having integral reinforcements uniting the last named reinforcement with the portion of increased thickness.

6. A glare shield comprising a sheet, a thickened reinforcing portion at one longitudinal edge of said sheet, said thickened portion having continuations extending along side edges thereof, said continuations curving inwardly of the sheet and terminating at points spaced inwardly of another edge of said sheet, said continuations and curved portions being gradually tapered toward said terminal points, and a metallic reinforcing tube imbedded in the thickened portion of the sheet and providing a bearing for a support.

7. A glare shield comprising a sheet, a thickened reinforcing portion at one longitudinal edge of said sheet, a tubular metallic reinforcing element imbedded in said thickened portion and providing a bearing for the reception of a supporting element, and a reinforcement integral with said sheet and extending parallel to said bearing, said last named reinforcement being spaced from said bearing and substantially parallel thereto.

8. A glare shield comprising, a sheet, a thickened reinforcing portion at one longitudinal edge of said sheet, a tubular metallic element imbedded in said thickened portion and providing a bearing for the reception of a supporting element, and a reinforcement integral with said sheet and extending parallel to said bearing, said last named reinforcement being spaced from said bearing, said sheet having integral reinforcements uniting the last named reinforcement with the portion of increased thickness.

REX C. JACOBS.